(12) United States Patent
Chand et al.

(10) Patent No.: US 8,275,680 B2
(45) Date of Patent: Sep. 25, 2012

(54) ENABLING TRANSACTIONAL MECHANISMS IN AN AUTOMATED CONTROLLER SYSTEM

(75) Inventors: Sujeet Chand, Brookfield, WI (US); Stephen C. Braint, Moon Township, PA (US); Kenwood H. Hall, Hudson, OH (US); Gavan W. Hood, Upper Lockyer (AU); John J. Baier, Mentor, OH (US); Michael D. Kalan, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1790 days.

(21) Appl. No.: 11/241,410

(22) Filed: Sep. 30, 2005

(65) Prior Publication Data
US 2007/0078736 A1 Apr. 5, 2007

(51) Int. Cl.
*G06Q 40/00* (2006.01)
(52) U.S. Cl. ............................. 705/35; 705/36
(58) Field of Classification Search ............... 705/35–39
See application file for complete search history.

(56) References Cited

U.S. PATENT DOCUMENTS

| | | | |
|---|---|---|---|
| 4,268,901 A | 5/1981 | Subrizi et al. |
| 4,347,564 A | 8/1982 | Sugano et al. |
| 4,623,964 A | 11/1986 | Getz et al. |
| 4,990,838 A | 2/1991 | Kawato et al. |
| 5,072,374 A | 12/1991 | Sexton et al. |
| 5,185,708 A | 2/1993 | Hall et al. |
| 5,253,184 A | 10/1993 | Kleinschnitz |
| 5,301,320 A | 4/1994 | McAtee et al. |
| 5,446,868 A | 8/1995 | Gardea et al. |
| 5,455,775 A | 10/1995 | Huber et al. |
| 5,485,620 A | 1/1996 | Sadre et al. |
| 5,504,891 A | 4/1996 | Motoyama et al. |
| 5,537,585 A | 7/1996 | Blickenstaff et al. |
| 5,572,731 A | 11/1996 | Morel et al. |
| 5,611,059 A | 3/1997 | Benton et al. |
| 5,619,724 A | 4/1997 | Moore |
| 5,634,048 A | 5/1997 | Ryu et al. |
| 5,644,740 A | 7/1997 | Kiuchi |
| 5,675,748 A | 10/1997 | Ross |
| 5,715,413 A | 2/1998 | Ishai et al. |
| 5,721,905 A | 2/1998 | Elixmann et al. |
| 5,761,499 A | 6/1998 | Sondregger |
| 5,797,137 A | 8/1998 | Golshani et al. |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |

(Continued)

OTHER PUBLICATIONS

Pitzek et al., Configuration and Management of a Real-Time Smart Transducer Network, 2003 IEEE, 2003, 4 pages.

(Continued)

*Primary Examiner* — Thu Thao Havan
(74) *Attorney, Agent, or Firm* — Turocy & Watson, LLP; Alexander R. Kuszewski; John M. Miller

(57) ABSTRACT

The claimed subject matter provides a controller that facilitates implementing a transaction between a controller and a business system within an industrial automation environment. An interface component can facilitate receipt of data associated with a business system at the programmable logic controller. The controller can incorporate a transaction component that executes a transaction related to the business system.

31 Claims, 11 Drawing Sheets

U.S. PATENT DOCUMENTS

| | | |
|---|---|---|
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru |
| 5,978,577 A | 11/1999 | Rierden et al. |
| 5,980,078 A | 11/1999 | Krivoshein et al. |
| 5,983,016 A | 11/1999 | Brodsky et al. |
| 6,011,899 A | 1/2000 | Ohishi et al. |
| 6,032,208 A | 2/2000 | Nixon et al. |
| 6,044,217 A | 3/2000 | Brealey et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,327,511 B1 | 12/2001 | Naismith et al. |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,425,051 B1 | 7/2002 | Burton et al. |
| 6,438,744 B2 | 8/2002 | Toutonghi et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,484,061 B2 | 11/2002 | Papadopoulos et al. |
| 6,501,996 B1 | 12/2002 | Bieber |
| 2,001,438 A1 | 1/2003 | Kreidler et al. |
| 6,505,247 B1 | 1/2003 | Steger et al. |
| 6,510,352 B1 | 1/2003 | Badavas et al. |
| 6,539,271 B2 | 3/2003 | Lech et al. |
| 6,539,430 B1 | 3/2003 | Humes |
| 6,539,458 B2 | 3/2003 | Holmberg |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs |
| 6,738,821 B1 | 5/2004 | Wilson et al. |
| 6,745,089 B2 | 6/2004 | Rasmussen et al. |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,853,920 B2 | 2/2005 | Hsiung et al. |
| 6,865,509 B1 | 3/2005 | Hsiung et al. |
| 6,868,413 B1 | 3/2005 | Grindrod et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 2002/0012401 A1 | 1/2002 | Karolys et al. |
| 2002/0013748 A1 | 1/2002 | Edmison et al. |
| 2002/0069167 A1 | 6/2002 | Conlow |
| 2002/0073236 A1 | 6/2002 | Helgeson et al. |
| 2002/0087786 A1 | 7/2002 | Burton et al. |
| 2002/0091838 A1 | 7/2002 | Rupp et al. |
| 2002/0103785 A1 | 8/2002 | Harvey |
| 2002/0194577 A1 | 12/2002 | Connor et al. |
| 2003/0009253 A1* | 1/2003 | McIntyre et al. ............. 700/108 |
| 2003/0014387 A1* | 1/2003 | Kreidler et al. .................. 707/1 |
| 2003/0014500 A1 | 1/2003 | Schleiss et al. |
| 2003/0065673 A1 | 4/2003 | Grobler et al. |
| 2003/0090514 A1 | 5/2003 | Cole et al. |
| 2003/0120710 A1 | 6/2003 | Pulsipher et al. |
| 2003/0123467 A1 | 7/2003 | Du et al. |
| 2003/0126308 A1 | 7/2003 | Kim |
| 2003/0177114 A1 | 9/2003 | Lin et al. |
| 2003/0212828 A1 | 11/2003 | Miyazaki et al. |
| 2003/0218641 A1 | 11/2003 | Longobardi |
| 2004/0006401 A1 | 1/2004 | Yamada et al. |
| 2004/0024995 A1 | 2/2004 | Swaine |
| 2004/0044421 A1 | 3/2004 | Brune et al. |
| 2004/0073565 A1 | 4/2004 | Kaufman et al. |
| 2004/0098153 A1 | 5/2004 | Neudeck |
| 2004/0167790 A1 | 8/2004 | Grasse |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2005/0005289 A1 | 1/2005 | Adolph et al. |
| 2005/0044112 A1 | 2/2005 | Yamamoto et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |

OTHER PUBLICATIONS

European Search Report dated Jun. 12, 2005 for European Patent Application Serial No. EP05016793, 3 pages.
John Kubiatowicz, et al. "OceanStore: an Architecture for Global-Scale Persistent Storage" ASPLOS 2000, Cambridge, Massachusetts (2000).
Roy Goldman, et al. "From Semistructured Data to XML: Migrating the Lore Data Model and Query Language" (1999).
International Search Report and Written Opinion dated Mar. 26, 2008 for PCT Application Serial No. PCT/US06/37353, 9 Pages.

* cited by examiner

ENABLING TRANSACTIONAL MECHANISMS IN AN AUTOMATED CONTROLLER SYSTEM

TECHNICAL FIELD

The subject innovation relates to industrial control systems and, more particularly, to enabling utilization of legacy devices when updating an industrial control system data model.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

As can be discerned from the above, data associated with conventional industrial controllers is created, delivered, and/or stored with a flat namespace data structure. In other words, all that can be discerned by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

Furthermore, updating data structures of controllers is associated with another array of implementation problems. For instance, some legacy controllers or other devices may not be associated with sufficient memory and/or processing power to support an updated application, and it is not cost effective for a company to replace every controller within an enterprise. Therefore, not only will multiple copies of data be existent within an industrial automation environment, but multiple copies of disparately structured data will be existent upon a network. Applications may require disparate mapping modules to enable mapping between controllers associated with first and second architectures. Thus, simply updating an architecture of controllers does not alleviate current deficiencies associated with industrial controllers in an industrial automation environment.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate implementing a transactional operation within an industrial automation environment. A controller can incorporate a transaction component within to allow for seamless implementation of a transaction mechanism between the controller and a business system. In other words, the controller and incorporated transaction component enables communications to occur directly between a business system and an industrial automation system. More particularly, the subject innovation provides systems and methodologies that facilitate transactional communications directly between a controller and a business system and/or a business system database. For example, rather than the controller delivering data to middleware that thereafter modifies and relays such data to a business system database, the controller can initiate/complete a transaction directly with a business system database. Such direct transactions are enabled by defining available transactions and placing such definitions within the controller.

In addition, the controller can be associated with the physical location hierarchy of an industrial automation environment (e.g., a plant, factory, manufacturing facility, etc.), wherein the physical location hierarchy of an industrial automation environment can be based at least in part upon the hierarchically structured data model. The controller can relate to the hierarchically structured data model that utilizes a naming convention, wherein the naming convention for a variable, a tag (e.g., an input and/or output of a PLC, including physical and virtual), and/or automation device can relate to a physical hierarchy of the industrial automation environment.

By incorporating transaction mechanisms within the controller, the transaction component can enable the controller to be one of the following: at least one of an initiator and a coordinator of the transaction; and at least one of a target and a participant in a larger transaction. The transaction component can provide built-in standard behavior for a transaction request, wherein the standard behavior can be, but is not limited to, a request transaction, a prepare transaction, a commit transaction, a rollback transaction, etc. Moreover, the transaction component can enable user logic to be written to develop the transaction to be written in a programming language that is appropriate and/or compatible for a particular controller and/or industrial automation device. Furthermore, the transaction component can provide standard distributed transaction mechanisms such as two phase commit (2PC) and three phase commit (3PC), etc.

In accordance with one aspect of the claimed subject matter, the transaction component can include at least one of a request analyzer and a subscribing component. The request analyzer can receive a subscription request and analyze the subscription request to locate and a defined transaction that corresponds to such data. The subscription request can originate manually from a user or can originate from a software component or other suitable automatic means. In accordance with one aspect of the subject innovation, the subscription request will be related to a particular type of data. Upon the request being analyzed, the subscribing component can subscribe the business system to the controller, wherein such controller relates to the requested data. Such subscription allows the controller (e.g., transaction originators within and/or related to the controller 202) to have knowledge of a location to deliver beginnings of a transaction.

In accordance with another aspect of the claimed subject matter, the transaction component can include at least one of a bridge component and an override component. The bridge component facilitates networking within the industrial automation environment, wherein the bridge component can act as a network bridge. Thus, data carried by disparate networks can be manipulated so that it conforms to a common network. Moreover, the override component can allow the override of standard behaviors for a possible transaction request. Yet, where standard behaviors are insufficient, the override component can enable the override of these behaviors by supplying logic to implement the required behaviors.

In accordance with another aspect of the innovation described herein, the transaction component can include at least one of a query component, a manager component, and a log component. The query component provides querying of the system including various transactions utilized therein. The manager component can transparently manage the state of the transaction across the distributed transaction. Moreover, the manager component can provide standard transaction handling and recover mechanisms for timeouts and communication losses. By utilizing the log component that tracks and/or records data related to transactions, the manager component can various data manipulation and management features. In other aspects of the claimed subject matter, methods are provided that facilitate implementing a transactional operation within an industrial automation environment.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
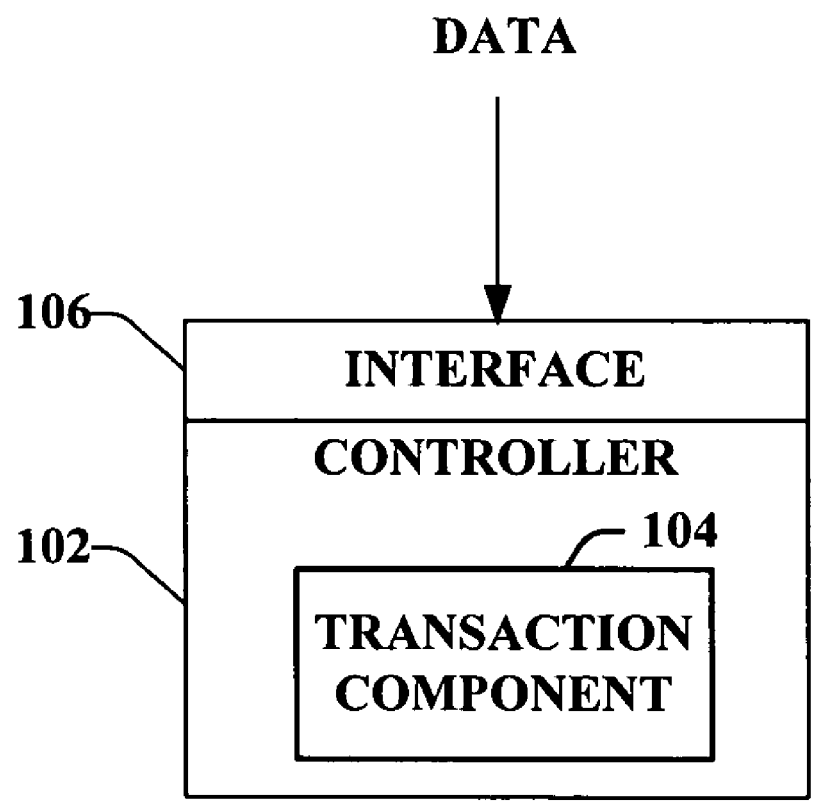
FIG. 1 illustrates a block diagram of an exemplary system that facilitates implementing a transactional operation within an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the innovation.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates implementing a transactional operation within an industrial automation environment. A controller 102 can incorporate a transaction component 104 that can execute transactional mechanisms based at least in part upon data received via an interface component 106 (discussed infra). For instance, the data received can relate to a business system (not shown). The system 100 facilitates transactional communications between a controller with an incorporated transaction component 104 and the business system, wherein a transactional communication is desired between such controller 102 and the business system. A transaction is a unit of interaction with a database management system (e.g., the business system) or similar system that is treated in a coherent and reliable way independent of other transactions. An ability to handle transactions ensures that integrity of databases within the controller 102 and the business system is maintained. Often, a single transaction can require a plurality of queries between the controller 102 and the business system, where data is written to and extracted from both the automation controller 102 and the business system several times prior to completion of the transaction.

By incorporating transaction mechanisms within the controller 102, the transaction component 104 can provide various capabilities to the system 100. For example, the transaction component 104 can enable the controller to be one of the following: at least one of an initiator and a coordinator of the transaction; and at least one of a target and a participant in a larger transaction. The transaction component 104 can provide built-in standard behavior for a transaction request, wherein the standard behavior can be, but is not limited to, a request transaction, a prepare transaction, a commit transaction, a rollback transaction, etc. Moreover, the transaction component 104 can enable user logic to be written to develop the transaction to be written in a programming language that is appropriate and/or compatible for a particular controller and/or industrial automation device. For instance, this can include languages covered in the IEC 61131-3 programmable controllers-programming languages specification. In another example, the languages can be, but is not limited to, a ladder diagram, structured text, function block, sequential function block, C, C++, C#, Java, etc. Furthermore, the transaction component 104 can provide standard distributed transaction mechanisms such as two phase commit (2PC) and three phase commit (3PC), etc.

Additionally, by incorporating the transaction component 104 into the controller 104, the initiator and/or coordinator of a transaction can support various functionalities. For example, straightforward programmatic mechanisms such as BeginTransaction, InitiateRemoteTransaction, SaveTransaction, CommitTransaction, RollbackTransaction, etc. can be supported. Moreover, the controller 102 and transaction component 104 can support any of the following: nested invocations of lower level transactions and possibly remote transactions (e.g., InitiateRemoteTransaction, etc.); incremental save points that enable the user to control how far an operation is rolled back (e.g., SaveTransaction, etc.); and transparent notification to all transaction participants of all advances in the transaction state (e.g., Beginning→Preparing, Preparing→Committing, ANY→Aborting, Any→Saving, etc.)—wherein such a mechanism can make user application handling of the various nested transaction participants unnecessary.

In accordance with an aspect of the subject innovation, the controller 102 can be a programmable logic controller (PLC). PLCs are small computers that are employed for automating real-world processes (e.g., controlling machinery within an industrial environment). Typically, PLCs are microprocessor-based devices with modular or integral input/output circuitry, wherein such circuitry is utilized to monitor status of field connected sensor inputs, and is further utilized to control output actuators according to a logic program. While PLCs can be utilized within the system 100 as the controller 102, it is to be understood that any suitable automation controller can be employed in connection with the claimed subject matter. For example, any suitable microprocessor and/or microcontroller can be utilized within the system 100 as the controller 102. Moreover, it is to be appreciated that the controller 102 can contain software components and hardware components having inputs and/or outputs that can be utilized in connection with automating an industrial manufacturing device/process. In addition, it is to be understood that the transaction component 104 can be incorporated into a plurality of controllers, and for the sake of brevity throughout the subject innovation, a single controller is depicted but the claimed subject matter is not so limited.

In addition, the controller 102 can be associated with the physical location hierarchy of an industrial automation environment (e.g., a plant, factory, manufacturing facility, etc.). The physical location hierarchy of an industrial automation environment can be based at least in part upon the hierarchically structured data model. In one particular example, the hierarchical data model can be modeled after ISA_S88, ISAS95, and/or a combination thereof. It is understood, however, that any manner of hierarchically configuring a factory can be utilized in connection with modeling.

For instance, the controller 102 can relate to the hierarchically structured data model that utilizes a naming convention, wherein the naming convention for a variable, a tag (e.g., an input and/or output of a PLC, including physical and virtual), and/or automation device can relate to a physical hierarchy of the industrial automation environment. For example, the physical hierarchy of the industrial automation environment can be indicative of a factory-level, a cell-level, a subcell level, input and outputs within each subcell, and the like. In one example, the physical hierarchy of the industrial automation environment can be enterprise, plant, site, cell, machine, automation device. For example, a first photo eye on controller 5, in cell A, in the Smithville Plant that is for packaging associated with a Chip Factory can be referenced as "ChipFactory/Packaging/SmithvillePlant/CellA/Controller5/photoeye1." By utilizing such a naming convention, tags, names, and/or references need not be unique, programming can be more generalized, reused, code can be more descriptive as well as information derived from code.

By implementing the transaction component 104 into the controller 102, a transaction mechanism and/or transaction can be supported by the system 100. For instance, by utilizing such transaction mechanisms and/or transactions, the following can be provided: 1) the controller 102 and/or system 100 can atomically interact with databases and/or data stores (not shown) to check for availability and reserve required raw materials, and/or allocate various equipment in a way where the operation can be committed or rolled back depending on the collective result of each reservation and/or allocation; 2) the controller 102 and/or system 100 can atomically interact with multiple other controllers to coordinate and initiate a process that involves all of the controllers; and 3) the controller 102 and/or system 102 can utilize a database system and/or data store to atomically interact with one or more database records as well as one or more controllers to perform a larger control transaction.

Furthermore, the system 100 can include any suitable and/or necessary interface component 106 (herein referred to as "interface 106"), which provides various adapters, connectors, channels, communication paths, etc. to integrate the controller 102 and integrated transaction component 104 into virtually any operating and/or database system(s). The interface 106 can receive data, wherein the data received can relate to a business system, a request, a subscription, data related to a transaction, etc. Such receipt of the data via the interface 106 allows the transaction component 104 to directly execute such transactions on the controller 102 to enable seamless interaction between the business system and the controller without the need of middleware. In addition, the interface component 106 can provide various adapters, connectors, channels, communication paths, etc., that provide for interaction with the controller 102.

Figure 2:
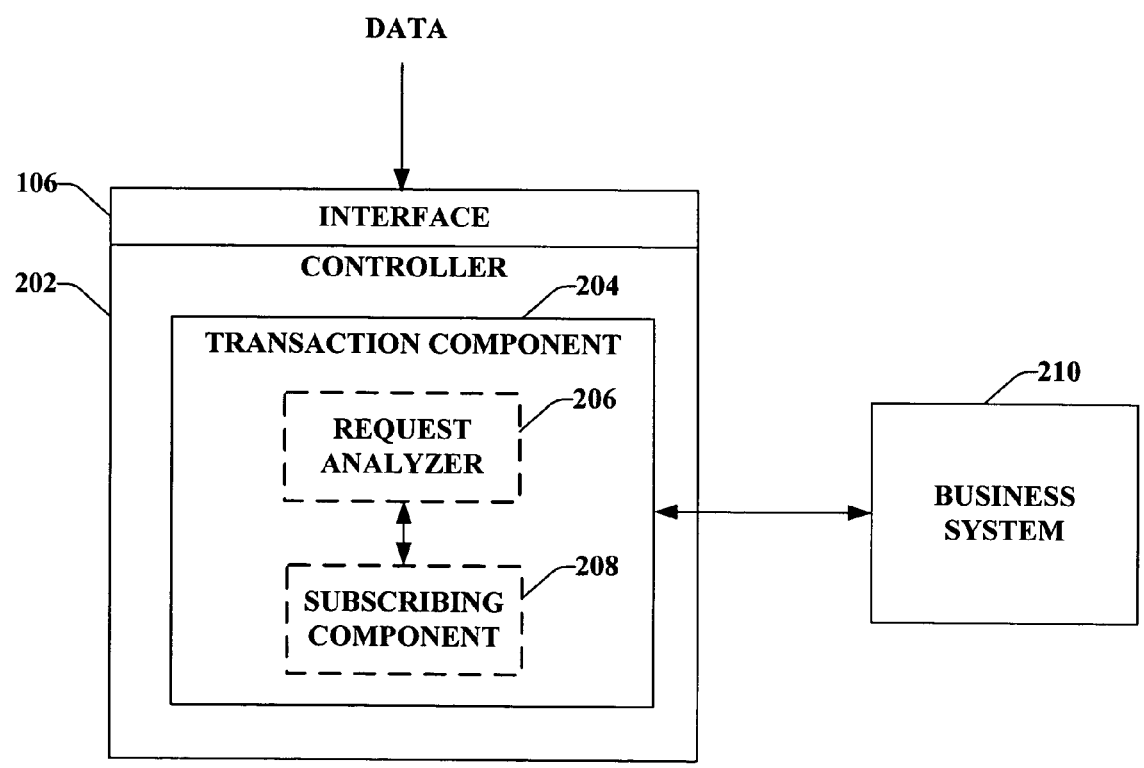
FIG. 2 illustrates a block diagram of an exemplary system that facilitates participating and/or initiating a transaction within a controller associated with an industrial automation environment.

FIG. 2 illustrates a system 200 that facilitates participating and/or initiating a transaction within a controller associated with an industrial automation environment. A controller 202 can incorporate a transaction component 204 that can execute transactional mechanisms based at least in part upon data received via the interface component 106 (discussed infra). For instance, the data received can relate to a business system 210. The system 200 facilitates transactional communications between the controller 202 with an incorporated transaction component 204 and the business system 210, wherein a transactional communication is desired between such controller 102 and the business system 210. Furthermore, the controller can be related with a hierarchically structured data model as described previously. It is to be appreciated that the controller 202 and the transaction component 204 can be substantially similar to the controller 102 and the transaction component 104 respectively as described in FIG. 1.

To effectuate a direct transaction between the controller 202 and the business system 210, a request analyzer 206 receives a subscription request. The subscription request can originate manually from a user or can originate from a software component or other suitable automatic means. In accordance with one aspect of the subject innovation, the subscription request will be related to a particular type of data. The request analyzer 206 can analyze the subscription request and locate a defined transaction that corresponds to such data. For example, if a user desired to receive data relating to a particular alarm/event, the request analyzer 206 can locate a transaction defined within the controller 202 that corresponds to the request. The defined transaction within the controller 202 should appear to the business system 210 as if such business system 210 is interacting with another business system (rather than the controller 202). Thus, utilizing the subject innovation, the business system 210 (and other associated business systems) will not require modification to interact directly with the controller 202.

Upon the request being analyzed, a subscribing component 208 is employed to subscribe the business system 210 to the controller 202, wherein such controller 202 relates to the requested data. Such subscription allows the controller 202 (e.g., transaction originators within and/or related to the controller 202) to have knowledge of a location to deliver beginnings of a transaction. As shown in FIG. 2, the subscribing component 208 would inform the controller 202 that transactions should be delivered to the business system 210. More specifically, the controller 202 can have knowledge of a particular database within the business system 210 in which to deliver transaction data. Thus, a channel would be opened between the business system 210 and the controller 202, rather than between the business system 210 and a database server (not shown) that pulls data from the controller 202 as is the case with respect to conventional systems. Further, the controller 202 can operate conventionally with respect to other factory devices. For instance, the controller 202 can receive unsolicited transactions from upper-level systems, such as supervisory plan floor systems or enterprise level systems, in order to drive operations of plant devices.

The transaction itself can occur similar to that of conventional transactions between databases. For example, the system 200 can include full transactioning capabilities utilizing the transaction component 204 incorporated into the controller 202. Particularly, each transaction undertaken between the controller 202 and the business system 210 can be fully buffered and associated with rollback capabilities. Thus, the transaction can begin between the controller 202 and the business system 210, but will not be completed until the transaction has been committed by both the controller 202 and the business system 210. If several queries have been undertaken prior to commitment of both entities (e.g., if the transaction fails for any reason), the system 200 can rollback any changes to place the system 200 in the same position as it had been prior beginning the transaction. All other transactions will behave in a manner as if the failed transaction never existed.

In accordance with one aspect of the subject innovation, the transaction between the controller 202 and the business system 210 can relate to several classes of data received by the interface 106. Amongst the several data classes are maintenance data, production schedule data, and batch operation information data. The maintenance class of data includes alarms and events related to a maintenance diagnostic feature. For example, operational failures, operator pressing a button, status of tape on a real, and other suitable events/maintenance data are included within the maintenance data class. Thus, the request analyzer 206 can receive a subscription request related to a certain event, condition, and/or information relating to maintenance, and locate an automation controller that includes a defined transaction relating to such data. Thereafter, the subscribing component 208 can open a channel between the controller 202 and the business system 210. Upon a passed period of time and/or occurrence of an event, either the controller 202 or the business system 210 can request a transaction therebetween.

Another class of data that can be subject to transactions is production schedule data. This data is often structured and defined by the SP95 standard, which allows for consistent data structure across applications. Examples of production schedule data include running capacity of a device (e.g., a device is running at 50% capacity), available parts for making a product, etc. Periodically, this data can be at least part of a transaction directly between the controller 202 (which has access to the data and/or stores the data in internal storage) and the business system 210. Particularly, upon receipt of a request for particular procedural data, the request analyzer 206 can review the request and determine which automation controller is related to the requested data. Thereafter, the subscribing component 208 is utilized to open a channel between the controller 202 and the business system 210 according to the analysis by the request analyzer 206. After passing of a set period of time or occurrence of a production schedule event, a transaction can be initiated between the controller 202 and the business system 210. It is understood that either the controller 202 or the business system 210 can initiate the transaction therebetween, and is merely a matter of design choice/convenience.

A third class of data that can be employed in connection with the subject innovation is batch operation information. Batch operation typically refers to processes that are employed to make products in bulk or through ingredients. For example, information relating to production of pharmaceuticals would be a batch record. More particularly, a recipe can call for distinct quantities of elements X, Y, and Z. Such distinct quantities can be stored as well as the quantities of X, Y, and Z actually utilized in making a product. Given increased threats of terrorism, it is important that such batch records (e.g., electronic batch recipe records) are accurately generated and stored, and are protected against security breaches. The system 200 of the subject innovation is an improvement for security purposes, as middleware is not required for undertaking of a transaction between the controller 202 and the business system 210. Rather, the request analyzer 206 and the subscribing component 208 operate in connection to facilitate sending/receiving transactional data directly between the controller 202 and the business system 210.

Figure 3:
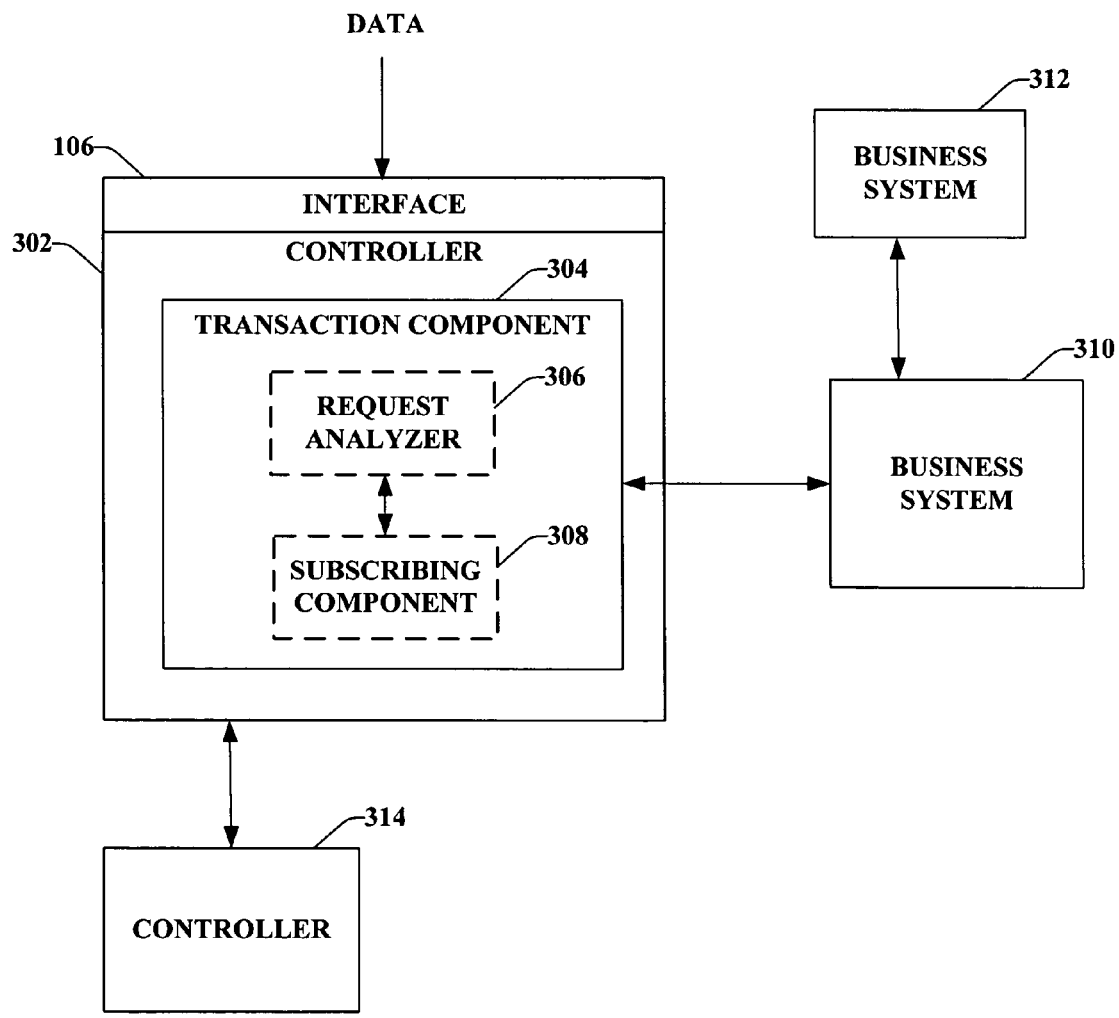
FIG. 3 illustrates a block diagram of an exemplary system that facilitates supporting a transactional mechanism within a controller in an industrial automation environment.

FIG. 3 illustrates a system 300 that facilitates supporting a transactional mechanism within a controller in an industrial automation environment. A controller 302 can internally incorporate a transaction component 304 that executes at least one transaction mechanism. The system 300 facilitates transactional communications between the controller 302 with an incorporated transaction component 304 and the business system 310, wherein a transactional communication is desired between such controller 102 and the business system. In addition, the controller 302 can relate to a hierarchically structured data model that utilizes a naming convention, wherein the naming convention for a variable, a tag (e.g., an input and/or output of a PLC, including physical and virtual), and/or automation device can relate to a physical hierarchy of the industrial automation environment. It is to be appreciated that the controller 302, the transaction component 304, and the business system 310 can be substantially similar to the controller, components, and systems described in previous figures.

The system 300 includes request analyzer 306 that receives data such as a request for a particular type of data via the interface 106. For example, the request can be for an alarm relating to a particular machine, or for specific batch records. The request analyzer 306 analyzes the request and locates the controller 302 that is associated with a transaction that encompasses the data. Specifically, the controller 302 can be associated with transaction definitions (not shown) and transaction semantics (not shown). Such transaction definitions enable the request analyzer 306 to quickly locate a defined transaction based upon a request for specific data and/or data originating from a particular procedure or event. A request is made to the request analyzer 306 to indicate that such data is desired on a periodic basis and/or on occurrence of an event or condition.

Upon the request being analyzed, a subscribing component 308 subscribes the controller 302 to a business system 310 according to the initial request. For example, the subscribing component 308 can open a channel between the controller 302 and an appropriate database (not shown) within the business system 310. Further, the business system 310 can include transaction definitions and transaction semantics, thus enabling the business system 310 to communicate effectively with the controller 302. It is not necessary that the business system 310 include explicit transaction definitions and semantics, as the controller 302 and incorporated transaction component 304 will be configured to appear no different than a disparate business system 312 to the business system 310.

The system 300 also includes another controller 314, which, like the controller 304, includes transaction definitions and transaction semantics that are pertinent to data associated with the automation controller. Thus, a transaction between the controller 302 and the business system 310 could occur without requiring middleware. Further, the controller 302 and the controller 314 can exchange data utilizing conventional data-exchange methods within an industrial automation environment. Moreover, the controllers 302 and 314 can control factory floor devices without sacrificing operability and/or efficiency while obtaining an ability to have direct transactions with the business system 310.

The system 300 further includes a separate business system 310 that includes a database (not shown). As the business system 304 treats the automation controller 302 as simply a disparate business system, the business system 310 does not require alteration to receive transactional data from an industrial automation system. Further, the business system 310 can communicate with the business system 312 in a conventional manner. For example, transactions can occur between the database and a disparate database (not shown) associated with the controller 302 based upon conventional methods. Thus, the business system 304 can enter into and complete transactions with the business system 314 as well as the controller 302 without requiring modification thereof.

Figure 4:
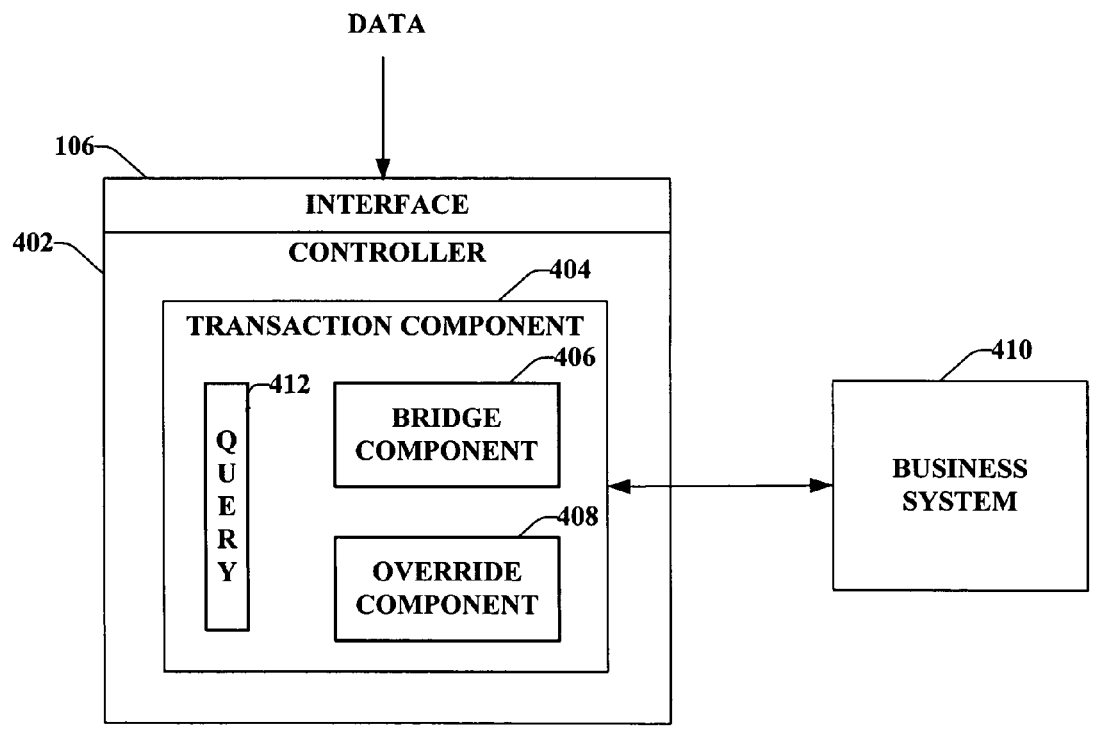
FIG. 4 illustrates a block diagram of an exemplary system that facilitates directly incorporating transactional mechanisms within a controller.

FIG. 4 illustrates a system 400 that facilitates directly incorporating transactional mechanisms within a controller. A controller 402 can incorporate a transaction component 404 that can execute data received via an interface component 106 (discussed supra). The transaction component 404 can execute directly on the controller 402 to enable seamless implementation of transaction mechanisms related to a business system 410. Moreover, the controller 402 can be compatible with a hierarchically structured data model that utilizes a naming convention for devices and/or variables based at least in part upon the physical location of the device and/or variable within the industrial automation environment. It is to be appreciated that the controller 402, the transaction component 404, and the business system 410 can be substantially similar to controllers, components, and systems described in previous figures.

The transaction component 404 can further include a bridge component 406 that facilitates networking within the industrial automation environment. In other words, the bridge component 406 can act as a network bridge. Thus, data carried by disparate networks can be manipulated so that it conforms to a common network. Accordingly, the bridge component 406 can recognize a network protocol associated with received instructions related to the controller 402 and perform operations to convert such data so that it conforms to a pre-defined protocol. Upon such conversion, a mapping can be employed to convert the data so that it conforms to the hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP).

Moreover, the bridge component 406 can support various disparate networks for the communication of the distributed transaction such as, but not limited to, Ethernet, ControlNet, DeviceNet, USB, etc. In other words, the system 400 utilizing the bridge component 406 can be network agnostic. In addition, the bridge component 406 can support both open and where necessary proprietary protocols to communicate the transaction over the various disparate networks.

The transaction component 404 can further include an override component 408 that allows the user to override standard behaviors. For instance, a standard behavior for a possible transaction request can be, but is not limited to, Request-Transaction, PrepareTransaction, CommitTransaction, RollbackTransaction, etc. Yet, where standard behaviors are insufficient, the override component 408 can enable the user to override these behaviors by supplying their own logic to implement the required behaviors. The override component 408 can provide standard entry points (e.g., well named subroutines) for these operations and state transitions (e.g., Requesting, Preparing, Committing, Aborting, Holding, Restarting, etc.). Such mechanisms, for instance, can enable the direction for the abort/rollback sequence to be different than the reverse of the original request sequence.

Moreover, the transaction component 404 can implement transaction mechanisms related to database transactions. The transaction component 404 extends this paradigm to include transactions that represent business and control system components within the system 400 that support transaction semantics. For instance, the business and control system components can be, but are not limited to, code components, service components, etc. The transaction component 404 can also support and/or specify a rewind process (e.g., rollback) that is different to the original transaction execution path. The transaction path for example can represent one set of controller code in the form of SFC, FB, ladder code and the rewind (e.g., rollback) can be in another section of SFC, FB, ladder or safety code.

The transaction component 404 can include a query component 412 (herein referred to as the "query 412") that allows querying of the system 400. In particular, when the controller 402 is the target and/or participant in a transaction, the transaction mechanisms can provide at least one of the following: discover services that enable network clients to discover and utilize the transactions defined within the controller 402 and which can provide for both existence and invocation of signature information; and extend discover services to enable clients to discover and utilize the transactions defined within the controller 402 via querying of the configuration file for the specified controller 402.

Figure 5:
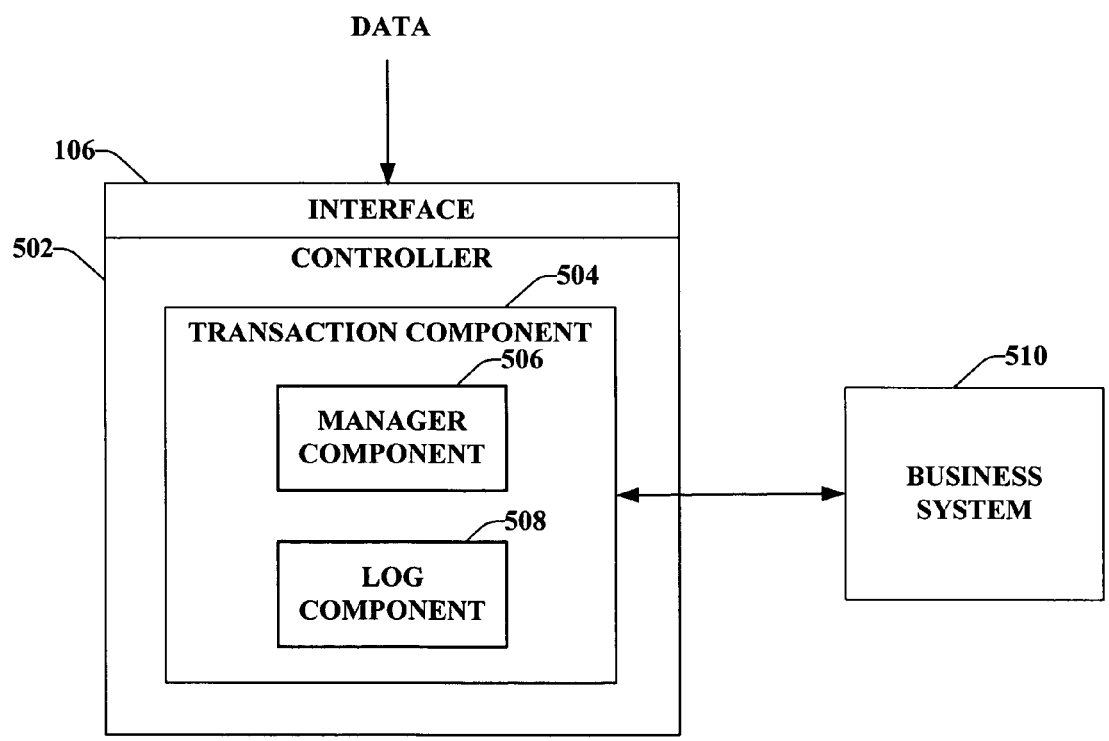
FIG. 5 illustrates a block diagram of an exemplary system that facilitates implementing a transaction within a controller in an industrial automation environment.

FIG. 5 illustrates a system 500 that facilitates implementing a transaction within a controller in an industrial automation environment. A controller 502 can integrate a transaction component 504 to allow the seamless execution of any suitable transactional mechanisms within the industrial automation environment. The transaction component 504 can execute directly on the controller 502 to enable seamless implementation of a transaction associated with a business system 510. With the aid of a hierarchically structured data model, the controller 502 with incorporated transaction component 504 can synthesize data from an industrial automation environment (e.g., a plant, a factory, a manufacturing facility, etc.) and/or a business system 510. It is to be appreciated that the controller 502 and the transaction component 504 can be substantially similar to the controllers and components described in previous figures The transaction component 504 can include a manager component 506 that manages data related to the system 500. The manager component 506 can transparently manage the state of the transaction across the distributed transaction. Moreover, the manager component 506 can provide standard transaction handling and recover mechanisms for timeouts and communication losses. For instance, such mechanisms can interpret a log component 508 (e.g., transaction log, discussed infra) and analyze whether it is possible to complete or abort a partial distributed transaction. The log component 508 can log various data and/or transaction data such as, but not limited to, nested local and/or distributed transactions and/or transaction state. The manager component 506 can further support power-up transaction recovery for incomplete transactions. The power-up recovery mechanism within the manager component 506 can interpret the log component 508 and decide whether or not to complete or abort a partially distributed transaction.

Figure 6:
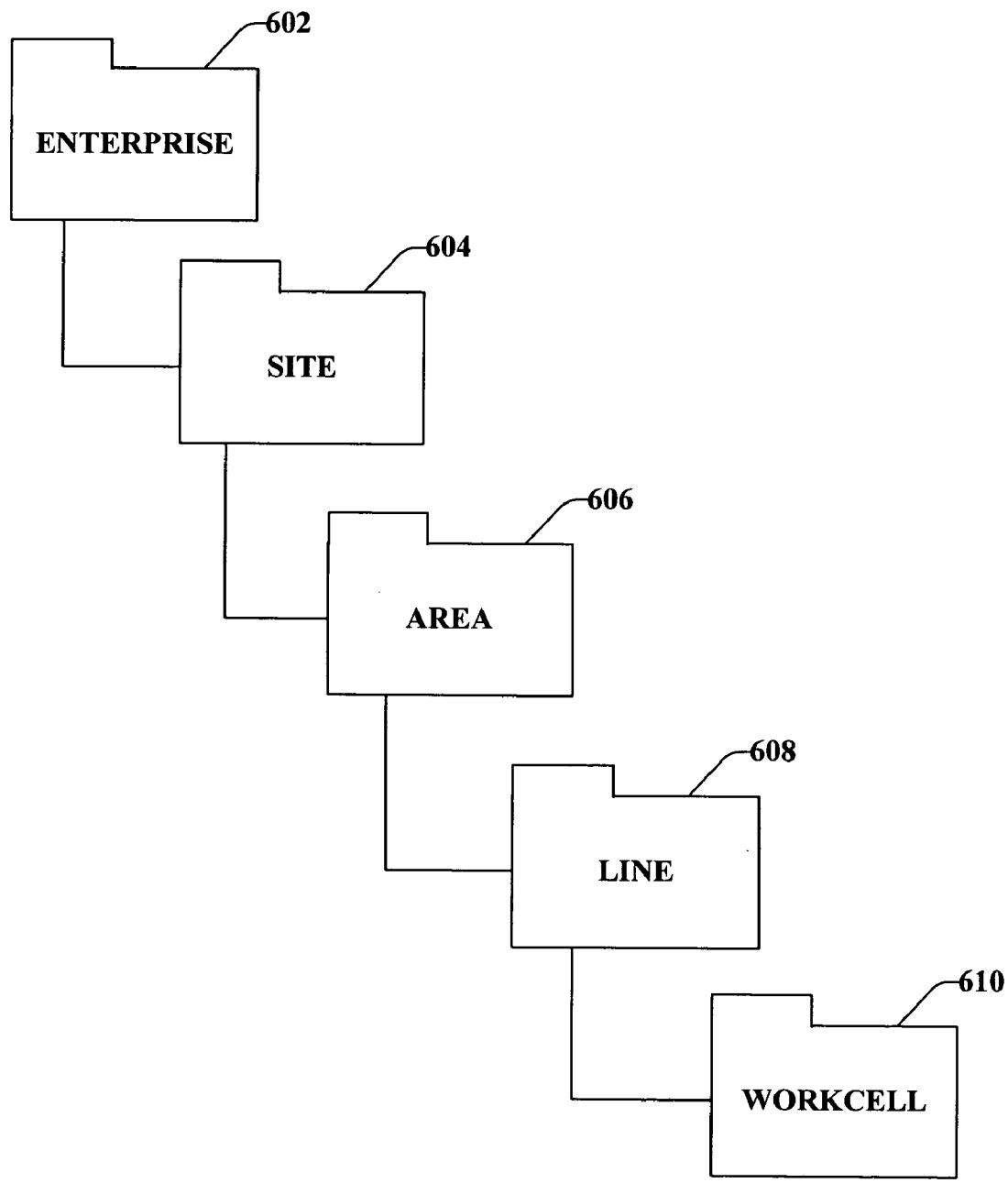
FIG. 6 illustrates a block diagram of an exemplary data structure that represents a hierarchical structure of an industrial automation system.

FIG. 6 illustrates a data structure 600 that represents a hierarchical structure of an industrial automation. For example, the data model can facilitate nested structures, thereby mitigating deficiencies associated with data models that employ flat namespaces. The structure 600 includes an enterprise level 602, where a particular enterprise can be represented within data structured in accordance with a hierarchical data model. Beneath the enterprise level 602 can be a site level 604, so that a particular factory (site) within an enterprise can be represented within a data packet. Beneath the site level 604 an area level 606 can exist, which specifies an area within the factory that relates to the data. A line level 608 can lie beneath the area level 606, wherein the line level 608 is indicative of a line associated with particular data. Beneath the line level 608 a workcell level 610 can exist, thereby indicating a workcell associated with the data. Utilizing a nested, hierarchical data model, PLCs and/or controllers can become more aware of data associated therewith. Furthermore, the hierarchy 600 can be customized by an owner of such hierarchy. For instance, more granular objects/levels can be defined within the hierarchy 600.

Figure 7:
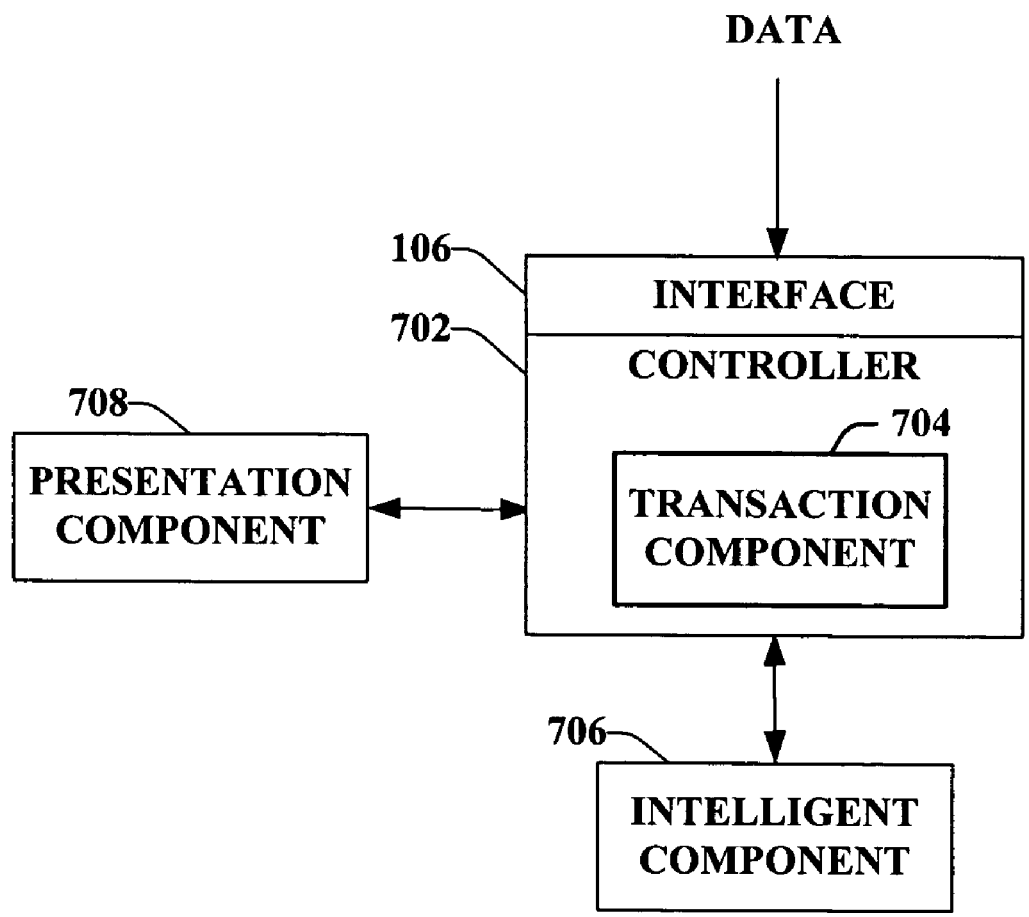
FIG. 7 illustrates a block diagram of an exemplary system that facilitates implementing a transactional operation within an industrial automation environment.

FIG. 7 illustrates a system 700 that employs intelligence to facilitate implementing a transactional operation within an industrial automation environment. The system 700 can include a controller 702 with an incorporated transaction component 704, and an interface 106 that can all be substantially similar to respective components, controllers, and interfaces described in previous figures. The system 700 further includes an intelligent component 706. The intelligent component 706 can be utilized by the controller 702 and/or the transaction component 704 to facilitate implementing a transactional operation within an industrial automation environment. For example, the intelligent component 706 can infer rollback, amount of rollback, whether a transaction is complete, repairable, whether to abort a transaction, whether a timeout or communication loss within a transaction can be rollbacked, etc.

It is to be understood that the intelligent component 706 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 708 can provide various types of user interfaces to facilitate interaction between a user and any component coupled to the controller 702 and/or the transaction component 704. As depicted, the presentation component 708 is a separate entity that can be utilized with the controller 702 and/or the transaction component 704. However, it is to be appreciated that the presentation component 708 and/or similar view components can be incorporated into the controller 702, incorporated into the transaction component 704 and/or a stand-alone unit. The presentation component 708 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the controller 702 and/or the transaction component 704.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
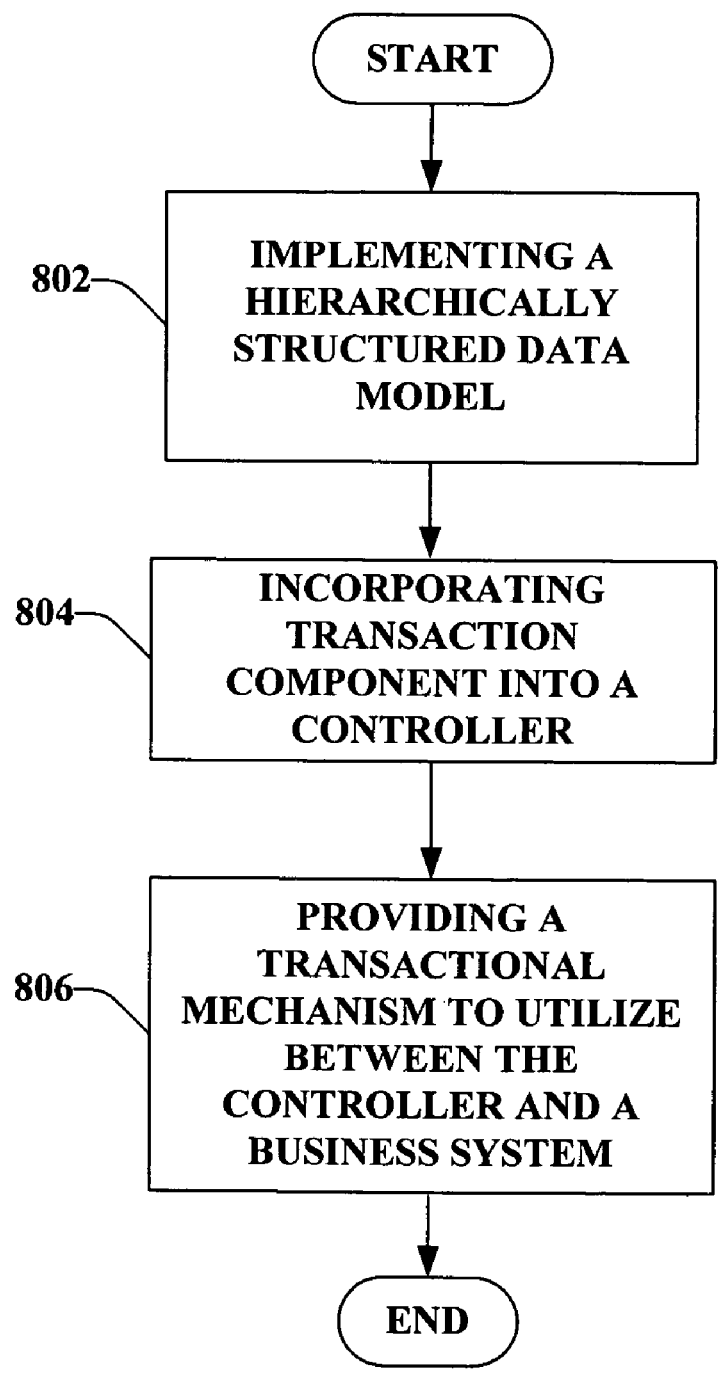
FIG. 8 illustrates an exemplary methodology for implementing a transactional operation within a controller associated with an industrial automation environment.
Figure 9:
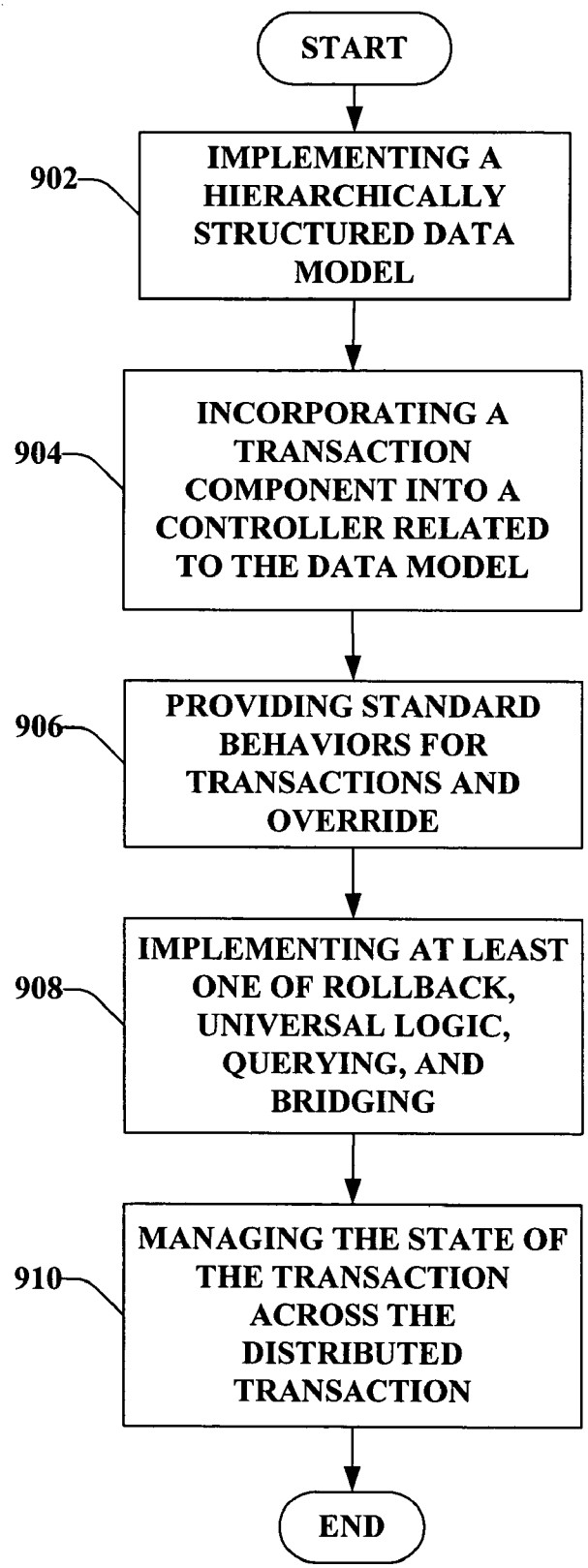
FIG. 9 illustrates an exemplary methodology that facilitates participating and/or initiating a transaction within a controller associated with an industrial automation environment.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 8, a methodology 800 is illustrated for implementing a transactional operation within a controller associated with an industrial automation environment. At reference numeral 802, a hierarchically structured data model can be implemented that utilizes a naming convention. The naming convention can represent a device and/or variable, wherein the representation of such device and/or variable includes the physical location within the industrial automation environment. It is to be appreciated that the device can be, but is not limited to, a roller, a station, a welder, a scanner, a belt conveyor, a pump, a press, a fan, etc., or any other suitable device utilized in automation systems. Furthermore, the device can be controlled by a controller. It is to be appreciated that the controller can contain software components and hardware components having inputs and/or outputs that can be utilized in connection with automating an industrial manufacturing device/process.

For example, the physical hierarchy of the industrial automation environment can be indicative of a factory-level, a cell-level, a subcell level, input and outputs within each subcell, and the like. Thus, the naming convention includes the physical hierarchy within the tag, reference and/or name of the device and/or logical variable. For example, a first photo eye on controller 5, in cell A, in the Smithville Plant that is for packaging associated with a Chip Factory can be referenced as "ChipFactory/Packaging/SmithvillePlant/CellA/Controller5/photoeye1."

At reference numeral 804, a controller can incorporate a transaction mechanism. The controller can contain software components and hardware components having inputs and/or outputs that can be utilized in connection with automating an industrial manufacturing device/process. The controller can be associated with the physical location hierarchy of an industrial automation environment (e.g., a plant, factory, manufacturing facility, etc.). The physical location hierarchy of an industrial automation environment can be based at least in part upon the hierarchically structured data model. In one particular example, the hierarchical data model can be modeled after ISA_S88, ISAS95, and/or a combination thereof. It is understood, however, that any manner of hierarchically configuring a factory can be utilized in connection with modeling.

At reference numeral 806, the incorporated transaction mechanism within the controller can enable seamless transactions between the controller and the business system. The transaction mechanism can execute directly on the controller. For instance, by utilizing such transaction mechanisms within a controller, the following can be provided: 1) atomically interacting with databases and/or data stores to check for availability and reserve required raw materials, and/or allocate various equipment in a way where the operation can be committed or rolled back depending on the collective result of each reservation and/or allocation; 2) atomically interacting with multiple other controllers to coordinate and initiate a process that involves all of the controllers; and 3) utilizing a database system and/or data store to atomically interact with one or more database records as well as one or more controllers to perform a larger control transaction.

FIG. 9 illustrates a methodology 900 that facilitates participating and/or initiating a transaction within a controller associated with an industrial automation environment. At reference numeral 902, a hierarchically structured data model can be implemented that utilizes a naming convention. The naming convention can represent a device and/or variable, wherein the representation of such device and/or variable includes the physical location within the industrial automation environment. For example, the physical hierarchy of the industrial automation environment can be indicative of a factory-level, a cell-level, a subcell level, input and outputs within each subcell, and the like. At reference numeral 904, a controller incorporates transaction mechanism, wherein the controller relates to the hierarchically structured data model (discussed supra).

At reference numeral 906, the incorporated transaction mechanisms within the controller can provide standard behaviors for transactions. For instance, the standard behaviors can be one of the following: a request transaction, a prepare transaction, a commit transaction, a rollback transaction, etc. Yet, where standard behaviors are insufficient, there can be an override that enables a user to override these behaviors by supplying their own logic to implement the required behaviors. Standard entry points (e.g., well named subroutines) for these operations and state transitions (e.g., Requesting, Preparing, Committing, Aborting, Holding, Restarting, etc.) can be provided. Such mechanisms, for instance, can enable the direction for the abort/rollback sequence to be different than the reverse of the original request sequence.

At reference numeral 908, at least one of a rollback, universal logic, querying, and bridging can be implemented. Particularly, each transaction undertaken between the controller and a business system can be fully buffered and associated with rollback capabilities. Thus, the transaction can begin between the controller and the business system, but will not be completed until the transaction has been committed by both the controller and the business system.

Moreover, user logic can be provided that allows a transaction to be written in a programming language that is appropriate and/or compatible for a particular controller and/or industrial automation device. For instance, this can include languages covered in the IEC 61131-3 programmable controllers—programming languages specification. In another example, the languages can be, but is not limited to, a ladder diagram, structured text, function block, sequential function block, C, C++, C#, Java, etc.

Querying can be provided when the controller is the target and/or participant in a transaction, the transaction mechanisms can provide at least one of the following: discover services that enable network clients to discover and utilize the transactions defined within the controller, and which can provide for both existence and invocation of signature information; and extend discover services to enable clients to discover and utilize the transactions defined within the controller via querying of the configuration file for the specified controller. In addition, bridging can facilitate networking within the industrial automation environment. In other words, bridging can act as a network bridge. Thus, data carried by disparate networks can be manipulated so that it conforms to a common network.

At reference numeral 910, the state of the transaction can be managed across a distributed transaction. In other words, a transparent management of the state of the transaction can be implemented across the distributed transaction. Moreover, power-up transaction recovery for incomplete transactions can be utilized. For instance, such mechanisms would be able to interpret the status of the transaction and determine whether to complete or to abort a partial distributed transaction.

Figure 10:
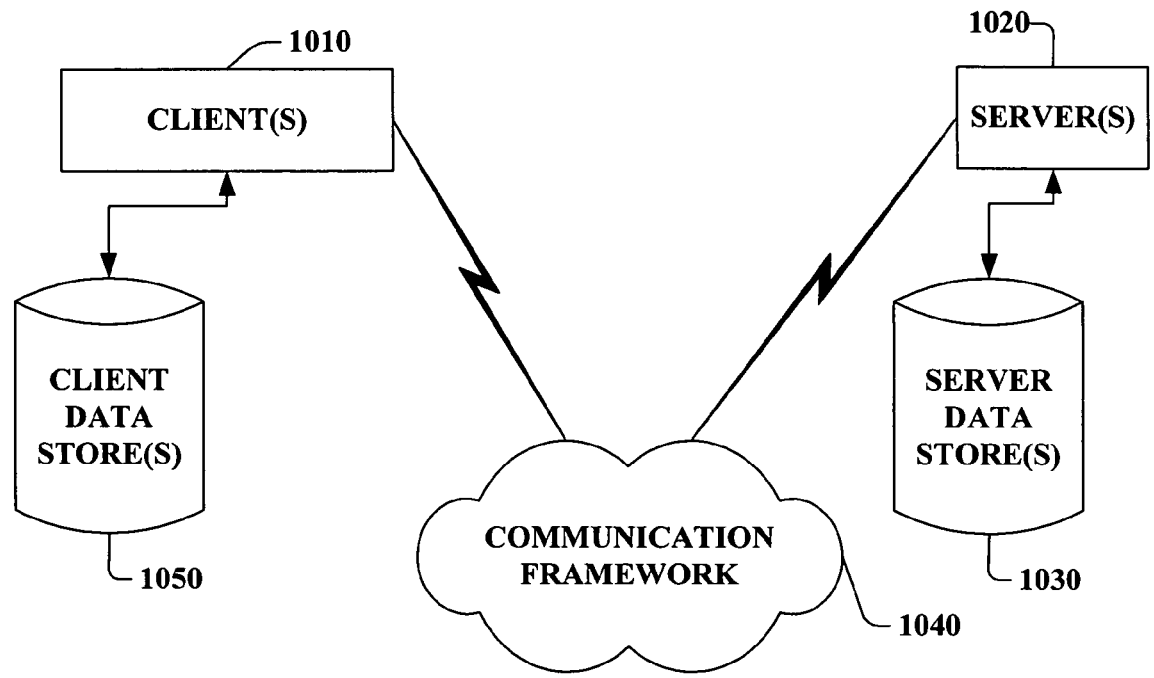
FIG. 10 illustrates an exemplary networking environment, wherein the novel aspects of the claimed subject matter can be employed.
Figure 11:
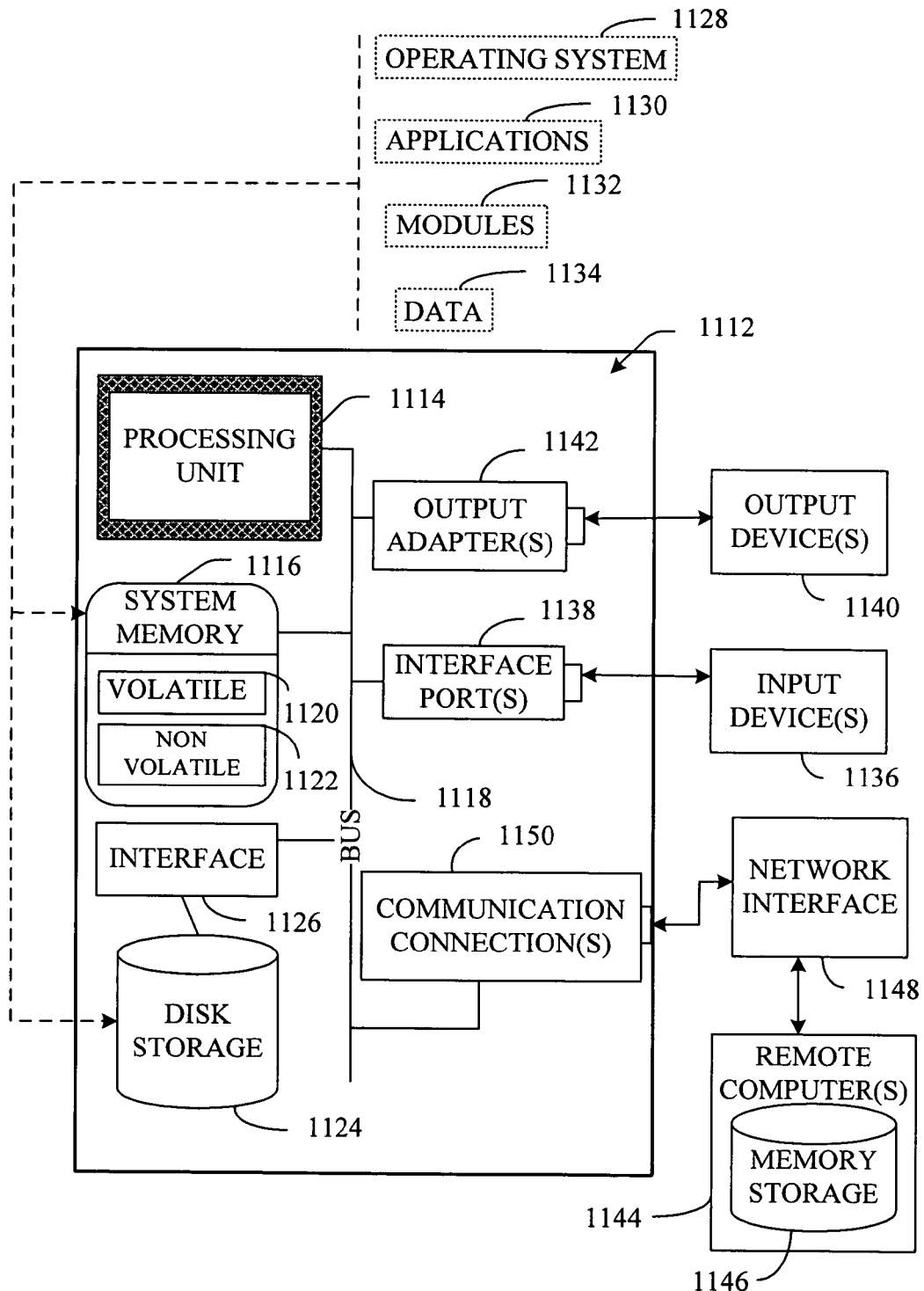
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
   a processor;
   a memory communicatively coupled to the processor, the memory having stored therein computer-executable instructions configured to implement the system, comprising:
      an interface component configured to receive, from a business system, a request for data, stored on an industrial controller, that corresponds to a specified data class; and
      a transaction component configured to execute a transaction definition, defined in the industrial controller, corresponding to the specified data class,
      wherein the transaction component is further configured to roll back a transaction executed by the transaction definition to a configurable save point in response to a failure of the transaction.

2. The system of claim 1, wherein the transaction component is further configured to open a channel that links the industrial controller to the business system in response to execution of the transaction definition.

3. The system of claim 1, wherein the transaction component is further configured to subscribe the business system to the industrial controller based at least in part upon execution of the transaction definition.

4. The system of claim 3, wherein the transaction component is further configured to send the data to the business system at least one of periodically or in response to occurrence of a defined event in accordance with an instruction included in the request.

5. The system of claim 1, wherein the hierarchically structured data model is based upon at least one of International Society of Automation S95 standard (ISAS95) or International Society of Automation S88 standard (ISA_S88).

6. The system of claim 1, wherein the transaction component is further configured to roll back the transaction to the configurable save point in response to a failure of communication between the industrial controller and the business system.

7. The system of claim 1, wherein the industrial controller relates to a hierarchically structured data model that represents a physical hierarchical location within an industrial automation environment.

8. The system of claim 7, wherein the physical hierarchical location is indicative of at least one of a factory level, a cell level, a subcell level, an input within a subcell, or an output within the subcell.

9. The system of claim 7, wherein the transaction component is further configured to convert the data to a hierarchical format that conforms to the hierarchically structured data model prior to sending the data to the business system.

10. The system of claim 1, wherein the industrial controller is configured to atomically communicate with a second industrial controller to coordinate a process.

11. The system of claim 1, wherein the transaction definition defines a plurality of queries between the industrial controller and the business system.

12. The system of claim 1, wherein the specified data class is at least one of maintenance data, alarms, production schedule data, device capacity, part availability, or batch operation information data.

13. The system of claim 1, wherein the transaction component is further configured to utilize at least one standard behavior that includes at least one of a request transaction, a prepare transaction, a commit transaction, or a rollback transaction.

14. The system of claim 13, wherein the transaction component is further configured to allow an override of the at least one standard behavior.

15. The system of claim 14, wherein the override is at least one of logic to implement a behavior, a standard entry point, or a state transition.

16. The system of claim 1, wherein the transaction component is further configured to execute an operation to reserve at least one of a raw material or a piece of equipment, and to at least one of commit the operation or roll back the operation to the configurable save point based on an availability indicated in a database.

17. The system of claim 1, further comprising a query component configured to enable a network client to discover the transaction definition within the industrial controller via a query of a configuration file for the industrial controller.

18. The system of claim 1, wherein the transaction component is further configured to determine whether to complete an incomplete transaction or abort the incomplete transaction during a recovery operation based on an analysis of a log of transaction data associated with the incomplete transaction.

19. The system of claim 1, further comprising a log component configured to record log data related to a transaction executed by the transaction definition.

20. A method that facilitates implementing a transactional operation, comprising:
   using a processor to execute computer-executable instructions stored in a memory to perform operations, including:
      receiving, from a business system, a request for data corresponding to a specified data type;
      executing a transaction definition, stored on an industrial controller, corresponding to the specified data type;
      defining a save point, for a transaction performed by the transaction definition, specifying a point in the transaction; and
      rolling back the transaction to the save point in response to a failure of the transaction.

21. The method of claim 20, wherein the rolling back includes rolling back the transaction in response to a communication failure occurring between the business system database and the industrial controller during the executing.

22. The method of claim 20, the operations further including implementing a hierarchically structured data model representing a physical hierarchical location, within an industrial environment, of at least one of a device, a tag, or a variable associated with the industrial controller.

23. The method of claim 22, the operations further including:
   opening a communication channel between the industrial controller and the business system in response to the executing; and
   sending at least a subset of the data to the business system over the communication channel.

24. The method of claim 23, the operations further including:
   converting at least the subset of the data to a hierarchical naming format in conformance with the hierarchically structured data model prior to the sending.

25. The method of claim 20, wherein the executing the transaction definition includes executing the transaction definition defining a plurality of queries between the industrial controller and the business system.

26. A computer-readable medium having stored thereon computer-executable instructions that, in response to execution, cause a computing system to perform operations, including:
   receiving a request to subscribe a business system to receive controller data corresponding to a specified data type;
   executing a transaction definition, defined on an industrial controller, corresponding to the specified data type; and
   rolling back a transaction associated with the transaction definition to a defined save point in response to occurrence of a failure of the transaction.

27. The computer-readable medium of claim 26, the operations further including sending the at least a subset of the data to the business system at least one of periodically or in response to occurrence of a defined event in accordance with an instruction included in the request.

28. The computer-readable medium of claim 26, wherein the rolling back comprises rolling back the transaction in response to occurrence of a communication failure between the business system database and the automation controller during the transaction.

29. The computer-readable medium of claim 26, the operations further including:
   opening a channel that communicatively links the industrial controller and the business system in response to the executing; and
   sending at least a subset of the controller data from the industrial controller to the business system over the channel in accordance with the transaction definition.

30. The computer-readable medium of claim 29, the operations further including converting the at least a subset of the controller data to a hierarchical naming convention that conforms to a hierarchically structured data model defining a hierarchical location of the industrial controller within an industrial environment.

31. The computer-readable medium of claim 26, wherein the executing the transaction definition includes executing the transaction definition defining a plurality of queries between the industrial controller and the business system.

* * * * *